United States Patent [19]
Gray et al.

[11] Patent Number: 5,684,660
[45] Date of Patent: Nov. 4, 1997

[54] THIN FILM COIL HEAD ASSEMBLY WITH PROTECTIVE PLANARIZING COCOON STRUCTURE

[75] Inventors: G. Robert Gray, Fremont; Arun Malhotra, San Jose, both of Calif.

[73] Assignee: AIWA Research And Development, Inc., Fremont, Calif.

[21] Appl. No.: 438,230

[22] Filed: May 9, 1995

Related U.S. Application Data

[63] Continuation-in-part of Ser. No. 390,345, Feb. 17, 1995.

[51] Int. Cl.⁶ .................................................. G11B 5/147
[52] U.S. Cl. .................................................. 360/126
[58] Field of Search .................................... 360/126, 122, 360/121

[56] References Cited

U.S. PATENT DOCUMENTS

| Re. 35,228 | 5/1996 | Mowry et al. | 360/126 |
|---|---|---|---|
| 4,642,711 | 2/1987 | Yunoki et al. | 360/84 |
| 4,825,532 | 5/1989 | Ricards | 29/603 |
| 4,901,178 | 2/1990 | Kobayashi et al. | 360/126 |
| 5,068,760 | 11/1991 | Kira | 360/121 |
| 5,134,534 | 7/1992 | Sasaki | 360/126 |
| 5,146,378 | 9/1992 | Makino et al. | 360/121 |
| 5,153,980 | 10/1992 | Kira | 29/603 |
| 5,237,476 | 8/1993 | Bischoff et al. | 360/126 |
| 5,267,392 | 12/1993 | Gooch et al. | 29/603 |
| 5,285,341 | 2/1994 | Suzuki et al. | 360/121 |

FOREIGN PATENT DOCUMENTS

| 0 337 879 | 10/1989 | European Pat. Off. . |
|---|---|---|
| 0 568 966 | 11/1993 | European Pat. Off. . |
| 6338030 | 12/1994 | European Pat. Off. . |
| 2 271 880 | 4/1994 | United Kingdom . |

*Primary Examiner*—John H. Wolff
*Attorney, Agent, or Firm*—Skjerven, Morrill, MacPherson, Franklin & Friel

[57] ABSTRACT

A thin film head is disclosed which is miniaturized to fit within a reduced size window or circumferential slot in a rotary head assembly. The thin film head and window or slot can be made so small that undesired tape cupping into the window or slot is significantly reduced. The thin film head includes a substrate of electrically insulative material. In one embodiment, a substantially helical thin film coil structure is situated atop the substrate. A magnetic core extends through the coil structure so that the coil structure can magnetically excite the core. The core includes first and second side pole members. A protective cocoon of electrically insulative material covers the coil structure and the core except for ends of the first and second side pole members. The cocoon includes an upper planar surface which exposes the ends of the first and second side pole members to permit coupling thereto by a magnetic gap structure. An elevated thin film magnetic gap structure is positioned atop the coil structure and the upper planar surface of the protective cocoon. Protection from ambient conditions is thus provided to both the coil structure and the magnetic core while simultaneously enhancing the planarity of the layers above the planar upper surface of the protective cocoon.

12 Claims, 13 Drawing Sheets

THIN FILM COIL HEAD ASSEMBLY WITH PROTECTIVE PLANARIZING COCOON STRUCTURE

CROSS REFERENCE TO RELATED PATENT APPLICATIONS

This patent application is a continuation-in-part application of our copending patent application entitled "THIN FILM HELICAL COIL HEAD ASSEMBLY", Ser. No. 08/390,345, filed Feb. 17, 1995.

This patent application is related to the copending patent application entitled "THIN FILM MAGNETIC COIL CORE", (Attorney Docket No. M-2782US) by G. Robert Gray and Arun Malhotra, filed concurrently herewith and assigned to the same assignee, the disclosure thereof being incorporated herein by reference.

This patent application is also related to the copending patent application entitled "THIN FILM MAGNETIC HEAD INCLUDING AN ELEVATED GAP STRUCTURE" by G. Robert Gray and Arun Malhotra, Ser. No. 08/296,388, filed Aug. 26, 1994 and assigned to the same assignee, the disclosure thereof being incorporated herein by reference.

This patent application is also related to the copending patent application entitled "THIN FILM MAGNETIC HEAD INCLUDING MULTIPLE GEOMETRY GAP STRUCTURES ON A COMMON SUBSTRATE" by Arun Malhotra and G. Robert Gray, Ser. No. 08/296,617, filed Aug. 26, 1994 and assigned to the same assignee, the disclosure thereof being incorporated herein by reference.

This patent application is related to the copending patent application entitled "METHOD FOR FABRICATING A PLANAR THIN FILM STRUCTURE", by James Watterston, Ser. No. 08/349,712, filed Dec. 5, 1994 and assigned to the same assignee, the disclosure thereof being incorporated herein by reference.

BACKGROUND OF THE INVENTION

1. Field of the Invention

This invention relates in general to magnetic recording and playback heads and, more particularly, to thin film magnetic recording and playback heads.

2. Description of Related Art

In the continuing quest for increased storage density in magnetic media storage devices, thin film magnetic heads have been developed. As opposed to earlier types of magnetic heads, the fabrication of which involves significant piecework and manual handling of individual tiny components, thin film magnetic heads take advantage of semiconductor fabrication processes to form a large number of heads simultaneously on a common substrate or wafer. Once the thin film heads are formed on a suitable substrate or die, the die is cut up into individual heads.

Thin film heads typically include magnetic pole pieces which are separated by a gap therebetween. The gap length, $L_G$, is defined to be the distance between the magnetic pole pieces which form the gap of the thin film head. The gap length of a particular thin film head is generally related to the track width of the magnetic media on which the head records or plays back. In other words, the narrower the gap length of the head, the narrower the track width of the media becomes. In recent times, the trend has been toward magnetic media with smaller and smaller track widths. This trend is driven by the need to increase the storage density of data on magnetic media.

Thin film heads are often employed in video head assemblies and digital audio tape (DAT) head assemblies which use helical scanning of tape media to store information. These head assemblies are typically employed in rotary drum helical scan tape recorders. FIG. 1A shows a perspective view of a DAT head assembly 10 which includes a rotating drum 15 and a fixed drum 20. A thin film head 25 is mounted within a rectangular window 30 in rotating drum 15. Drum 15 with head 25 thereon is rotated by a motor (not shown) situated within fixed drum 20. Head 25 is rotated in the direction indicated by arrow 32. Fixed drum 20 includes a recessed tape guide 35 along which a media tape travels as the rotating drum 15 rotates the head across the media tape. The media tape is thus helically scanned by the head on the rotating drum. As can be seen in FIG. 1A, thin film head 25 must be sufficiently small to fit into and be mounted within window 30.

FIG. 1B shows a perspective view of a DAT head assembly 50 which is similar to head assembly 10 of FIG. 1A except that assembly 50 includes a circumferential slot 55 between rotating drum 15 and a fixed drum 20. Thin film head 25 is mounted within slot 55. As seen in FIG. 1B, thin film head 25 must be sufficiently small to fit into and be mounted within slot 55.

Tape media has a tendency to deform or cup as it passes by a window such as window 30 of FIG. 1A or by a circumferential slot such as slot 55 of FIG. 1B. When this cupping action occurs, the tape is no longer flat but rather the tape deforms convexly into the window or slot as it passes by. Cupping action is undesirable since it tends to deform the tape and degrade the recording of information on the tape.

It is desirable to minimize the height of the slot or window (the vertical dimension in FIGS. 1A and 1B) to reduce the cupping action which causes tape media deformity. However, to reduce the height of the slot or window, correspondingly smaller and smaller thin film heads must be produced to fit within the slot or window.

Unfortunately, thin film heads which employ planar spiral coil structures, such as coils 60 and 65 shown in FIG. 2, consume a relatively large amount of substrate area. This is especially true when multiple heads and multiple coil structures are situated on a common die 70 as illustrated. It is difficult to sufficiently miniaturize this planar spiral type of head assembly to fit within reduced size windows and slot in the head assembly.

While consuming a relatively large amount of surface area, these thin film head devices often include so many layers that planarization problems are encountered as the constituent layers are stacked up, one upon the other. To the extent that any particular layer is nonplanar, subsequent layers fabricated above such a layer tend to inherit undesired nonplanarity.

Moreover, the constituent layers of such thin film head devices are often not well protected from the environment. Upon completion of fabrication, many layers of the device are still open to ambient conditions. Contamination is thus possible which might impair or prevent operation of the thin film head device.

SUMMARY OF THE INVENTION

Accordingly, a head assembly is disclosed, one embodiment of which exhibits a geometry and configuration that is suitable for miniaturization to fit within reduced size slots and windows in the head assembly. The head assembly advantageously exhibits a coil resistance which is significantly less per coil turn than head assemblies using planar spiral coil structures. The head assembly includes a protective cocoon structure which protects the assembly from the environment while simultaneously promoting planarity of the assembly.

In accordance with one embodiment of the present invention, a thin film head is provided which includes a substrate of electrically insulative material. A thin film coil structure is situated atop the substrate. The thin film head also includes a core of thin film magnetic material extending through the thin film coil structure to enable the thin film coil structure to magnetically excite the core. The core includes first and second side pole members having respective first and second side pole ends. The thin film head further includes a protective cocoon of electrically insulative material covering the thin film coil and the core except for the first and second side pole ends. The protective cocoon includes an upper planar surface which exposes the first and second side pole ends. The thin film head also includes an elevated thin film magnetic gap structure situated atop the coil structure and the upper planar surface of the protective cocoon. This gap structure includes a first top pole member and a second top pole member which are respectively magnetically coupled to the first and second side pole ends. A gap region is formed between the first top pole member and the second top pole member. Protection from the operating environment is thus provided to the thin film coil structure and the core while simultaneously enhancing the planarity of structures above the protective cocoon.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

Figure 1A:
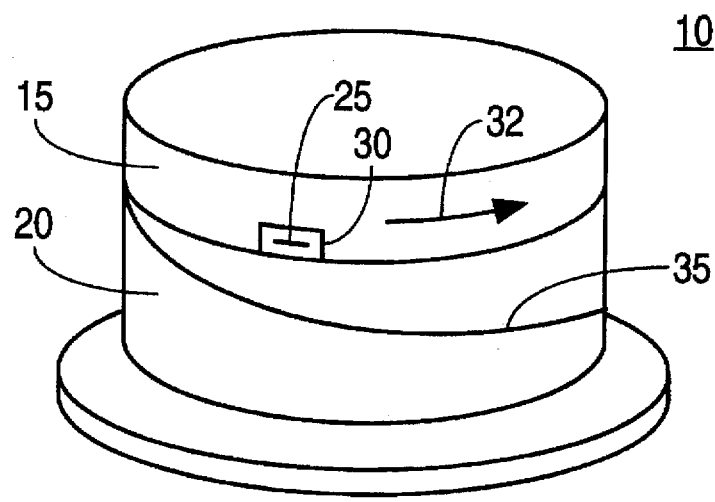
FIG. 1A is a top perspective view of a conventional head assembly employing a thin film head mounted within a window in a rotary drum.
Figure 1B:
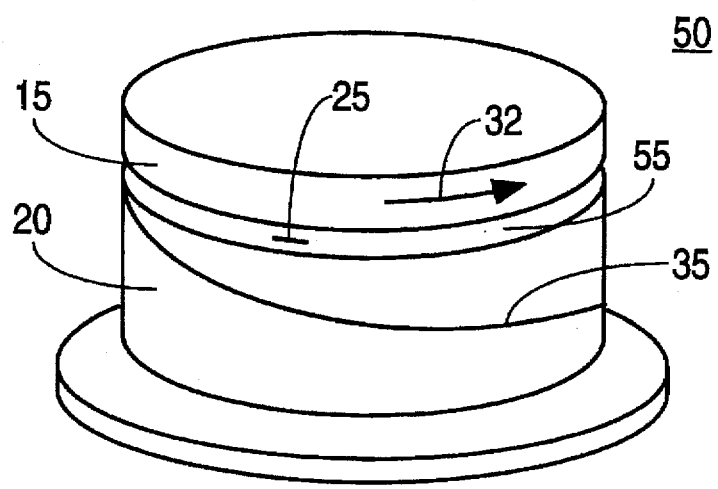
FIG. 1B is a top perspective view of a conventional head assembly employing a thin film head mounted in a circumferential slot between a rotary drum and a fixed drum.
Figure 2:
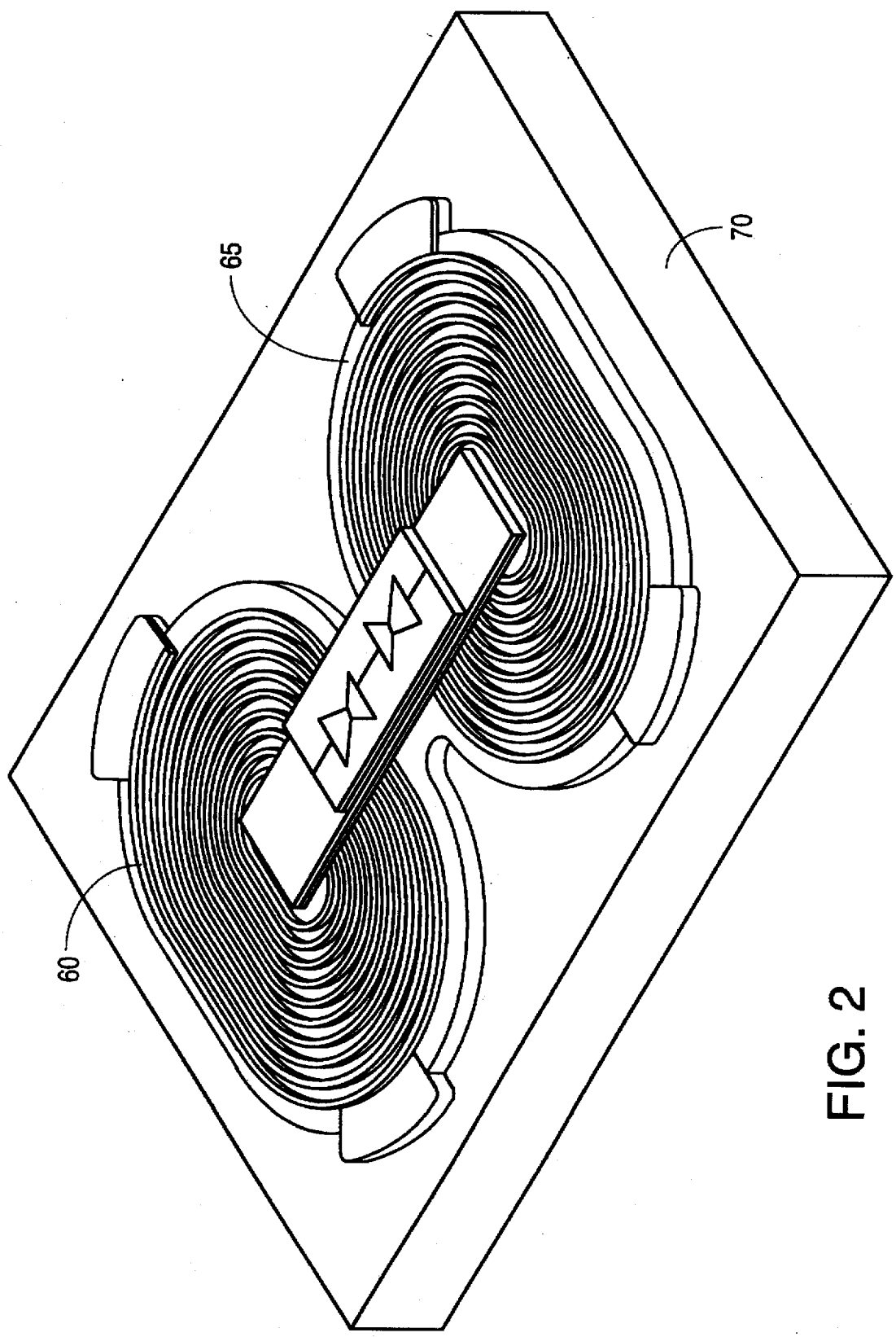
FIG. 2 is a top perspective view of a thin film head which employs a large planar spiral coil structure.
Figure 3A:
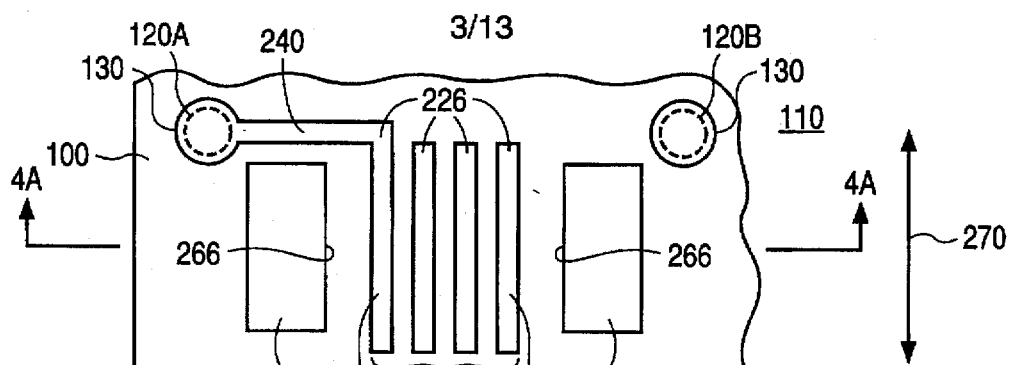
FIG. 3A–FIG. 3Q are top views of the disclosed thin film head during the multiple stages of fabrication.

FIG. 3A is a top view of a portion of a die or substrate 100 on which a thin film magnetic head recording structure 110 is to be fabricated. In this particular embodiment, substrate 100 is a wafer of electrically insulative material such as alumina ($Al_2O_3$), for example. Substrate 100 exhibits a thickness of approximately 25 mil and a diameter of approximately 150 mm. A substrate with these dimensions is readily compatible with conventional semiconductor processing standards and equipment. A 150 mm diameter wafer is capable of yielding approximately 10,000—approximately 20,000 thin film magnetic head recording structures. FIG. 3A shows a partially complete thin film head 110 in the early stages of fabrication.

Figure 4A:
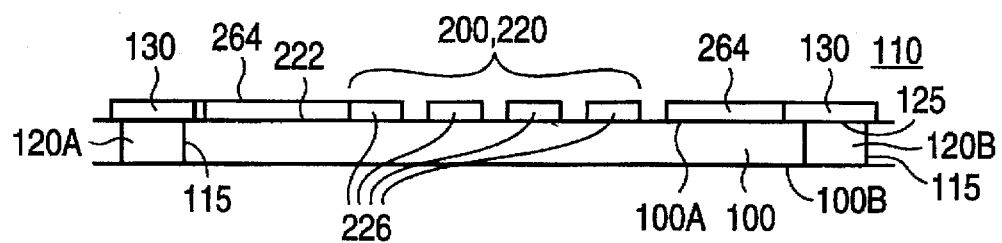
FIG. 4A–FIG. 4Q are cross sections of FIG. 3A–FIG. 3Q, respectively.

FIG. 4A is a cross section of the thin film head 110 of FIG. 3A taken along section line 4A—4A. As seen in FIG. 4A, substrate 100 includes multiple deep via holes 115 extending between the opposed major surfaces 100A and 100B of the substrate. Via holes 115 are formed in substrate 100 and are filled with an electrically conductive material to create conductive paths through substrate 100 at the locations shown. Laser drilling or other high precision via formation techniques may be employed to form via holes 115. Via holes 115 are filled with electrically conductive material such as plated copper, thick film processed gold, or sintered tungsten and copper, for example, to form via connective members 120A and 120B. Metal via connective members 120A and 120B can be formed by deposition of metal in the vertical or nearly vertical via holes 115 to form solid metal plugs therein.

A seed layer 125 of an electrically conductive material suitable for plating is sputtered on substrate surface 100A. Seed layer 125 is so thin that it does not appear to have significant thickness in FIG. 4B. Seed layer 125 may be fabricated from Cr-NiV, namely, a chrome or other adhesion-promoting layer followed by a non-magnetic nickel-vanadium 7% film. Seed layer 125 is sufficiently thick that conductivity for subsequently electro-plating is established.

Via caps 130 are patterned using photolithographic techniques and plated on seed layer 125 at the tops of via connective members 120A and 120B as shown in FIGS. 3A and 4A. More specifically, to pattern via caps 120, a photoresist layer (not shown) is deposited on seed layer 125 and patterned to include openings above via connective members 120A and 120B at which the formation of respective via caps 130 is desired. Plating is then conducted in these openings using seed layer 125 as the seed. The photoresist is then removed, thus leaving patterned via caps 130. As used in this document, the term "patterning" will mean the formation of a particular layer such that the layer exhibits a specified pattern, such as described with respect to the formation of via caps 120 above, for example.

Via caps 130 are fabricated from NiFe by any suitable deposition or plating process. It is noted that later in the process described herein, portions of seed layer 125 will be removed by sputter etching. While in the particular example described, via caps 130 are fabricated from NiFe, in actual practice via caps 130 can be fabricated from other conductive materials which would not be attacked by the particular etchant used to later remove Cr-Cu seed layers 222, 214, and 315. Via caps 130 are regarded as being a part of via connective members 120A and 120B.

Seed layer 125 is also used to pattern and NiFe plate photolithographic alignment targets (not shown) for registration of subsequent layers. The exposed portions of seed layer 125 are then sputter etched away leaving via caps 120 and the alignment targets intact. It should be appreciated that seed layer 125 served as a sacrificial layer for the purpose of enabling plating of via caps 130. Except for the portion of seed layer 125 which is under via caps 130, seed layer 125 is no longer present in head 110.

A thin film coil 200 is now fabricated atop substrate 100. Thin film coil 200 includes a first coil layer 220 which is visible in FIG. 4A and a second coil layer 212 which is fabricated later.

A first coil layer 220 is formed on upper surface 100A of ceramic substrate 100 using an electroplating method. The specific procedure for forming first coil layer 220 includes the steps of sputter-depositing a seed layer 222, patterning the seed layer 222, forming the first coil layer 220 by electroplating and then chemically etching away the exposed portions of seed layer 222. Electroplating is accomplished by first sputter-depositing a plating base seed layer 222, for example a chrome copper (CrCu) film, on a substrate front side surface 100A. The base seed layer depth is suitably thin, but sufficiently thick, so that conductivity for electroplating is established. Seed layer 222 is so thin that it does not appear to have significant thickness in FIG. 4A. Seed layer 222 is formed, for example, by sputter depositing a layer of chrome (not separately shown) on substrate surface 100A to a depth of approximately 300 Å to 500 Å, for example. A copper layer (not separately shown) is sputter deposited overlying the chrome deposition to a depth of approximately 1000 Å to form a second tier of seed layer 222. Seed layer 222 is patterned using conventional photolithographic techniques.

First coil layer 220 is then formed by electroplating, using electrolysis to apply metal to the surface of seed layer 222 above substrate surface 100A according to a coil pattern such as shown in FIGS. 3A and 4A. After the first coil layer 220 is formed, the exposed portions of seed layer 222 are removed by chemical etching so that elements of the first coil layer 220 sit discretely in electrical isolation upon the substrate surface 100A of the insulating substrate 100. For a chrome copper coil, chemical etching is achieved using a chrome etchant solution of 80 gm potassium permanganate and 20 gm potassium hydroxide dissolved in 1 liter of water and a copper etchant solution of 260 gm ammonium persulfate and 190 milliliters of 30% ammonium hydroxide dissolved in 3 liters of water.

Wet etching processes are associated with the various deposition steps of the illustrative fabrication method, including multiple electroplating steps. A wet etching process utilizes liquids, such as acids and other corrosive chemicals, as an etching agent. Etching proceeds through chemical reactions at the surface of a material. An additive electroplating fabrication process includes substantially fewer processing steps than a sputtering deposition operation which is associated with dry etching. Thus the electroplating and wet etch processes, in combination, reduce the cycle time of the fabrication process. In addition, circuits fabricated using electroplating and wet etching processes have shown an improvement in performance over devices fabricated using sputtering and dry etch processing of magnetic recording heads.

Figure 5:
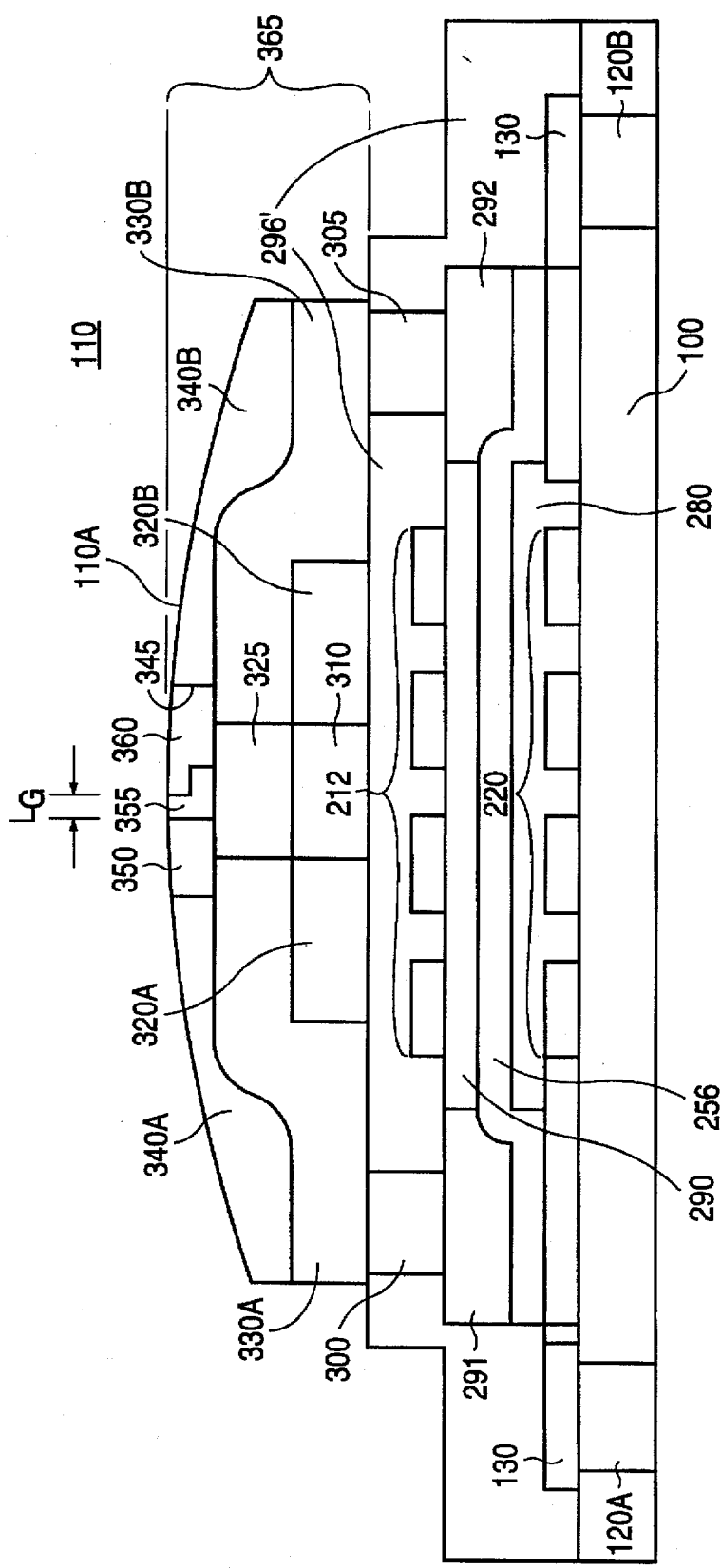
FIG. 5 is an enlarged cross section of the completed thin film head.

The first coil layer 220 is thus patterned, plated and chemically etched using conventional photolithographic techniques to form a fine pattern of mutually parallel lines 226 on the surface 100A of the ceramic substrate 100. In one embodiment, coil 200 is formed by approximately 20 to approximately 98 parallel lines or segments 226 which act as coil turns. Each line 226 exhibits a length of approximately 230 microns and a width of about five microns with the lines being separated by approximately two micron gaps. Coil lines 226 are parallel to an axis called an "easy axis". The term "easy axis" refers to the directionality of the magnetic field generated by the subsequently-formed thin film magnetic head 110 which is depicted in FIGS. 5–6. In FIG. 3A the easy axis 270 is aligned orthogonal to the direction of the magnetic flux density of the magnetic transducer 202.

A first coil line 232 is shown extended at one end in a direction orthogonal to the parallel coil lines 226 to form a lead line 240. Depending on the location of the via caps 130, lead line 240 may disposed at an angle different from orthogonal with respect to the coils lines. Thus, the lead line 240 is shown to be disposed parallel to a second axis, called a 272 in FIG. 3B, which is orthogonal to the easy axis 270.

In addition to the coil lines 226, the electroplating process is used to form two leveling blocks 264 on each lateral side of the parallel coil lines 226. The leveling blocks 264 are rectangular in shape, having a length of approximately 200 microns and a width of about 100 microns. The leveling blocks 264 are formed parallel to the coil lines and easy axis 270 and each includes a medial edge which is about 5 microns from the lateral edge of the outermost coil lines 232 and 234.

Leveling blocks 264 are used to support structures which are subsequently formed overlying the first coil layer 220. Leveling blocks 264 also serve to level the substrate surface 100A. Leveling blocks 264 are formed as part of the first coil layer 220 to achieve a level structure without performing an additional processing step.

Figure 3B:
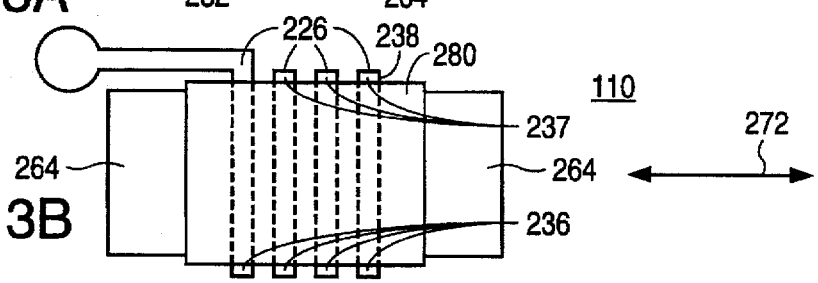
Figure 4B:
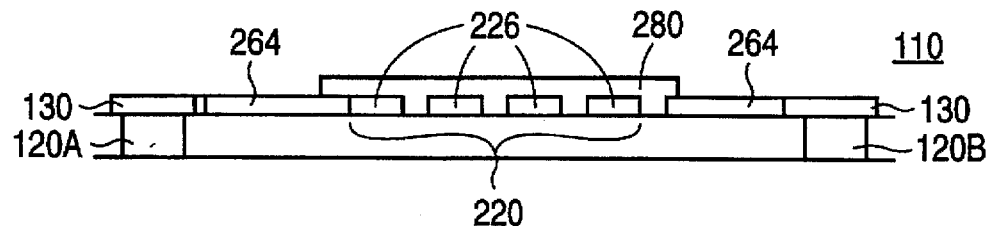

Referring to FIGS. 3B and 4B, a first insulating layer 280 is formed overlying the first coil layer 220 to electrically isolate the first coil layer 220 from a magnetic core 256 which is subsequently formed overlying the first coil layer 220. The first insulating layer 280 is formed from a suitable insulating material such as photoresist or a form of silicon oxide (such as silicon dioxide or silicon monoxide) or aluminum oxide. For example, an electron-beam cured photoresist, such as AZ4620 photoresist manufactured by Hoechst, may be utilized for the first insulating layer 280. AZ4620 photoresist is a relatively thick photoresist material which deposits in a thick layer to suitably cover the topography of first coil layer 220 and substrate surface 100A as shown. The photoresist layer is electron beam cured for a period of approximately fifteen minutes, greatly reducing the time of curing in comparison to the more commonly used curing method of hard baking. In addition, electron beam curing causes very little change in the surface profile of the resist from running or flowing so that a preferable level surface is attained following curing of the photoresist layer. During the electron beam curing process, the cross sectional profile of the resist layer does not change appreciably due to running or flowing of the photoresist.

The first insulating layer 280 is a laminar structure which is formed by a single laminar deposition and curing step. The first insulating layer 280 is patterned so that a square or rectangular surface area is covered, overlying the first coil layer 220 including the parallel coil lines 226 and extending in the direction of the hard axis 272 between medial edges 266 of respective leveling blocks 264. Leveling blocks 264 are not substantially covered by the first insulating layer 280 although a portion of insulating layer 280 slightly overlaps the edges of leveling blocks 264 as shown. The first insulating layer 280 is patterned so that first ends 236 and second ends 237 of each parallel coil line 226 are left uncovered by the insulating layer 280. The photoresist is initially patterned in a suitable form by exposure through a photomask. Approximately a 50–80 microns squared ($\mu^2$) area at the ends 236 and 237 of the coil lines 226 are left exposed, thereby forming a plurality of coil vias 238 at the ends 236 and 237 of the coil lines 226.

Figure 3C:
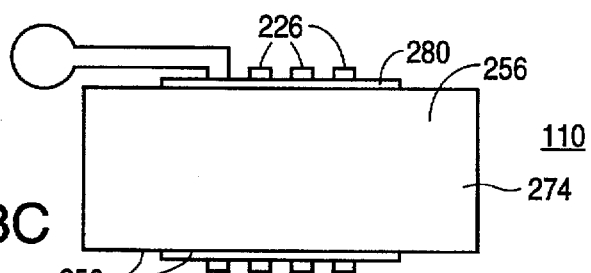
Figure 4C:
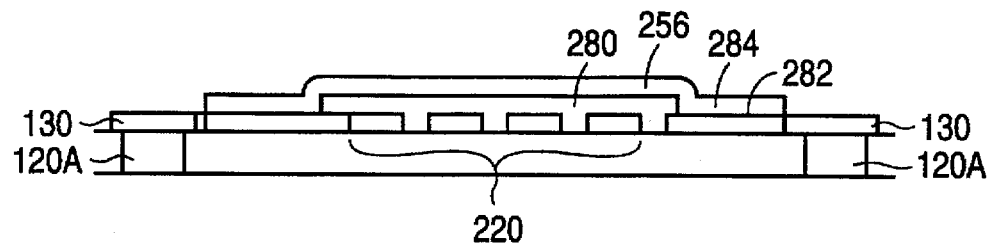

As shown in FIGS. 3C and 4C, the lower portion of magnetic core 256 is formed overlying the first insulating layer 280 to cover a substantially rectangular surface 274. Magnetic core 256 has a length extending in the direction of the hard axis 272 which is suitable for overlying the first coil layer 220 and first insulating layer 280 including the parallel coil lines 226 and extending beyond the lateral edges 266 of the leveling blocks 264. The width of the magnetic core 256 extends in the direction of the easy axis 270 only as far as the edge of the first insulating layer 280 so that the ends of the coil lines 226 in the first coil line layer 220 are left exposed.

The magnetic core 256 is a nickel-iron (NiFe) Permalloy deposition which is electroplated in the manner used to deposit the first coil layer 220. For example, a chrome copper seed layer 282 is deposited. However, before depositing the lower portion of magnetic core 256, a chrome copper seed layer 282 is formed in the pattern intended for magnetic core. The chrome copper seed layer 282 receives the NiFe deposition which forms the lower portion of magnetic core 256.

In actual practice, a "lift-off" process is used to form seed layer 282 with the intended pattern. A NiFe layer 284 is then patterned and plated onto the seed layer 282. The exposed portions of seed layer 282 are then etched away.

To actually form seed layer 282 of FIG. 4C by the lift-off process, the upper surface of partially complete head structure 110 of FIG. 4B is covered with photoresist (not shown). The photoresist is patterned to cover the entire upper surface of structure 110 except for the portion thereof where seed layer 282 is to be formed. (FIG. 4C shows the desired location of seed layer 282 as being the location where the lower portion of magnetic core 256 is to be patterned.) A layer of Cr-NiV (not shown) is then sputtered on the exposed upper surface of partially complete head structure 110.

The photo-resist which was patterned on head structure 110 is now "lifted-off" head structure 110. To accomplish this lift-off, the partially complete head 110 is placed in an ultrasonic bath including a photoresist solvent such as acetone, for example. The sputtered chrome copper layer is sufficiently thin such that it does not cover the photoresist layer very well at the lateral sides of magnetic core 256. In this manner, there are sufficient avenues of attack by which the solvent can get through the sputtered chrome copper layer at the edges thereof to dissolve the photoresist layer. When the photoresist layer is thus dissolved, the portions of the sputtered chrome copper layer float away except for the remaining desired seed layer location 282 under the future site of magnetic core 256. For simplicity, seed layer 282 is not shown in subsequent cross sectional drawings.

The NiFe permalloy used for magnetic core 256 exhibits a composition which is approximately 80% nickel and 20% iron. The lower portion of magnetic core 256 is a magnetically anisotropic structure which is formed by applying a magnetic anisotropy to the lower portion of core 256 in a direction parallel to a hard axis 272 direction. Deviations from a perfectly flat surface are generally caused by the finite thickness of the first insulating layer 280. Although a perfectly flat lower portion of magnetic coil 256 surface is theoretically ideal for magnetic performance and such a surface form is achievable through additional selective plating of the first coil layer 220, the degree of improvement in performance is not deemed sufficient to justify the additional processing. In other thin film magnetic core 256 embodiments, such additional processing may be justified by increased magnetic performance.

Figure 3D:
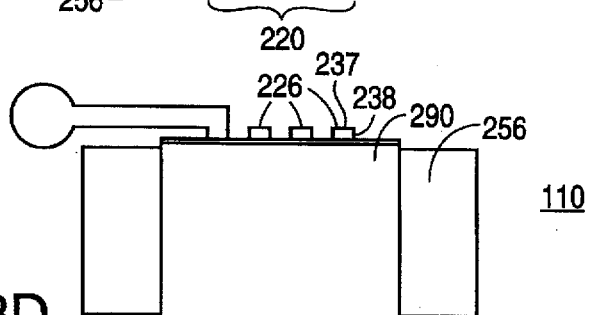
Figure 3E:
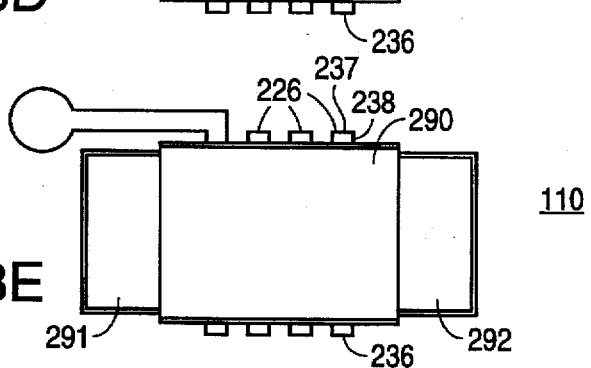
Figure 4D:
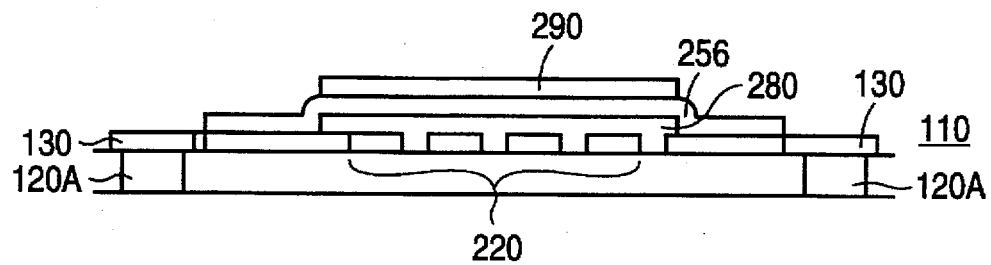

FIGS. 3D and 4D show the formation of a second insulating layer 290 overlying the lower portion of magnetic core 256 to electrically isolate magnetic core 256 from a second coil layer 212 which is subsequently formed overlying the magnetic the lower portion of core 256. Second insulating layer 290 is formed from a suitable insulating material and, in this illustrative embodiment, is constructed from the same electron beam-cured AZ4620 photoresist used to construct the first insulating layer 280. Second insulating layer 290 is patterned to overlie a central portion of the magnetic core 256 as shown in FIG. 4D. Second insulating layer 290 is patterned so that approximately a 50–80 microns squared ($\mu^2$) area at the ends of the parallel coil lines 226 is left exposed, thereby forming contact pads at ends 236 and 237 of each coil line 226.

Figure 4E:
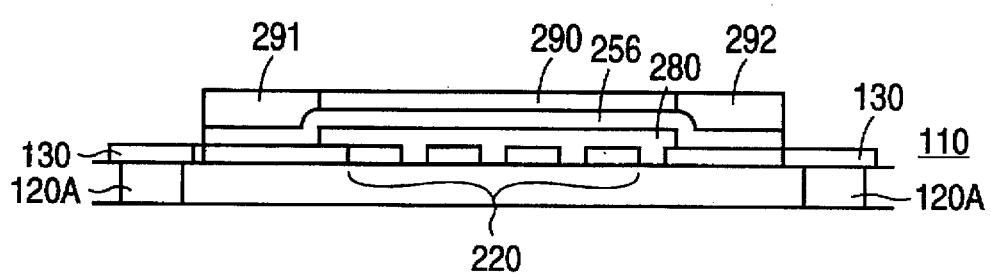

In the next step shown in FIG. 4E, side pole bases 291 and 292 are formed overlying the remainder of the lower portion of magnetic core 256 on both lateral sides of second insulating layer 290. Side pole bases 291 and 292 are formed by plating the same magnetic material (nickel-iron (NiFe) Permalloy) used to form the lower portion of magnetic core 256.

Figure 3F:
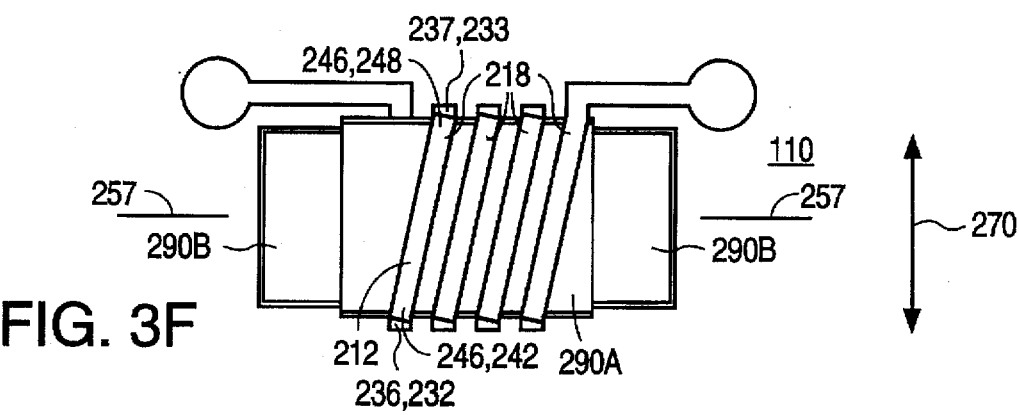
Figure 4F:
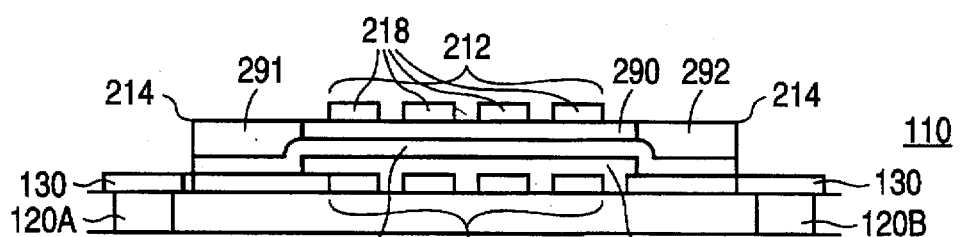

A second coil layer 212 of coil 200 is then formed on the surface of the second insulating layer 290 as shown in FIGS. 3F and 4F. The second coil layer 212 is formed in a similar manner to the procedure for fabricating first coil layer 220. However, the first coil layer 220 is efficiently fabricated using only a single mask since the entire coil is formed on a substantially level plane. In contrast, the second coil layer 212 is not formed on a level surface so that, in the illustrative embodiment of the fabrication method, multiple masks are utilized in the photolithographic procedure prior to electroplating for constructing the second coil layer 212. An appropriate amount of exposure varies in different regions of the coil surface area. Thus, the time of exposure varies in these different regions. A series of masks is utilized to achieve these variations in exposure time. In the illustrative embodiment of the fabrication method, three masks (not shown) are used to form the second coil layer 212.

The electroplating process for constructing second coil layer 212 includes forming a chrome copper plating base seed layer 214. A layer of chrome (not separately shown) and then a layer of copper (not separately shown) are sputter deposited overlying the second insulating layer 290 to form seed layer 214 as shown in FIG. 4F. To promote clarity in the drawings, seed layer 214 is not shown in FIG. 3F and the subsequent drawings. The second coil layer 212 is patterned using a first mask (not shown) of multiple masks. The first mask is a main mask which generally patterns the coil segments 218.

The coil second layer 212 is formed by approximately 20 to approximately 98 parallel lines or segments 218 with all coil lines extending from a first end 246 to a second end 248 at a slight angle with respect to the easy axis 270. The parallel second layer coil lines 218 are not aligned in parallel with the first layer coil lines 226 but are offset from the first layer coil lines 226. Thus, the first end 246 of a first second-layer coil line 242 directly overlies the first end 236 of the first first-layer coil line 232. However the second end 248 of the first second-layer coil line 246 directly overlies the second end 237 of a second first-layer coil line 233, which is adjacent to the first first-layer coil line 232. The coil second layer 212 is deposited onto the ends 236 and 237 of the first layer coil lines. In this manner first coil layer 220 and second coil layer 212 of FIG. 4F, which are each confined to a planar layer on a surface of the substrate, combine to form a generally helical coil structure. This helical coil structure includes a central longitudinal axis 257 as shown in FIG. 3F. More particularly, each coil line 218 of coil second layer 212 combines with a respective coil line 226 of coil first layer 220 to form a respective coil turn.

After seed layer 214 of the second coil layer 212 is patterned atop insulative layer 290, a second mask is used to clean out the "foot region" overlying the ends of the first layer coil lines where the second coil layer 212 makes contact with the first coil layer 220. Note that, prior to the application of the second mask, these foot regions are generally unobstructed since the intervening insulating layers 280 and 290 are in the form of rectangular layers which do not extend laterally to the ends of the coil lines but rather expose the ends of the coil lines of the first coil layer 220. The second coil layer 212 is formed by electroplating and includes a plurality of coil lines that extend laterally across the surface of the second insulating layer 290, but also includes vertical segments extending from the ends of the second layer coil lines 212 to the ends of the first layer coil lines 220. Thus the laterally-extending first layer coil lines 220 and the laterally-extending second layer coil lines 212 are connected by the vertical segments of the second layer coil lines 212 to complete a coil structure traversing about the lower portion of magnetic core 256.

A third mask is applied which covers the entire area of the coil region up to the edge of the insulating layer 290. Using the three masks for forming the second coil layer 212, photoetching exposure times are adjusted to suitably control the shape and thickness of the coil structure.

Figure 3G:
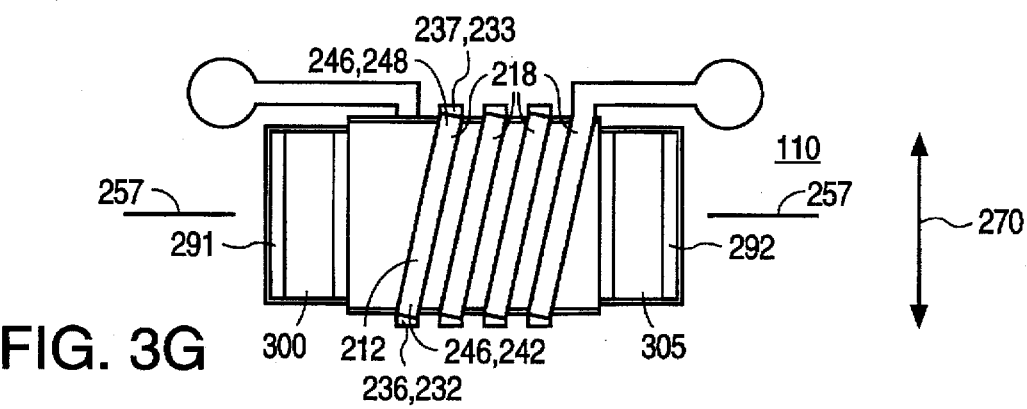
Figure 4G:
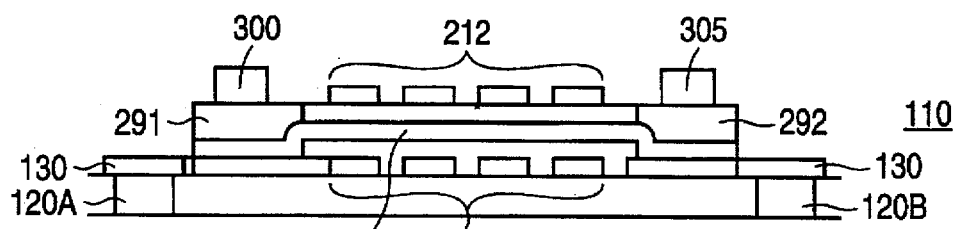

Referring to FIGS. 3G and 4G, side pole extensions 300 and 305 are formed atop side pole bases 291 and 292 respectively. More specifically, side pole extensions 300 and 305 are formed by patterning and plating NiFe magnetic material until side pole extensions 300 and 305 are approximately 15µ thick. Side pole base 291 and side pole extension 300 cooperate to form a first side pole. Similarly, side pole base 292 and side pole extension 305 cooperate to form a second side pole. These first and second side poles can be considered to be an extension of the magnetic core 256.

Figure 3H:
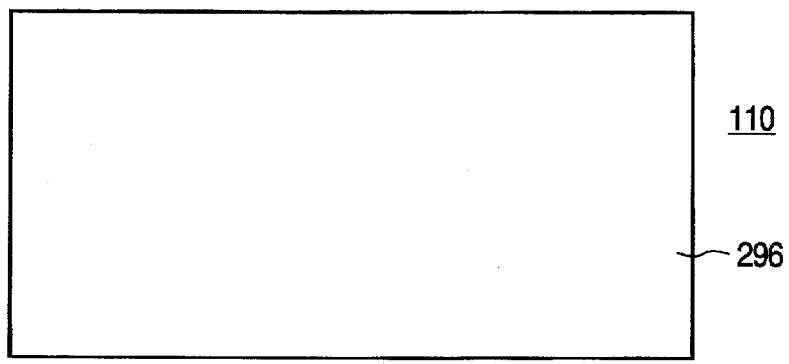
Figure 4H:
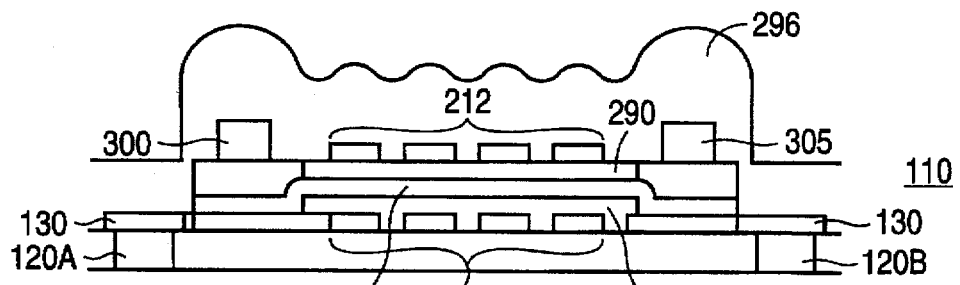

A layer of electrically insulative material 296 such as alumina (aluminum oxide) is sputtered over the entire wafer used to form thin film head assembly 110 as shown in FIGS. 3H and 4H. The thickness of insulative layer 296 is approximately equal to the height of the partially complete head assembly depicted in FIG. 4F. More specifically, the thickness of insulative layer 296 is typically within the range of approximately 20µ to approximately 40µ. However, it should be understood that the thickness of insulative layer 296 can also vary outside of this range depending upon the particular head application. Due to the relatively low sputtering rate of alumina, thinner insulative layers 296 are easier to fabricate. It should be understood that although the wafer from which head assembly 110 is formed is not yet diced up into separate head assemblies, head assembly 110 is shown as a separate head assembly in FIG. 3H for convenience in illustration.

Figure 3I:
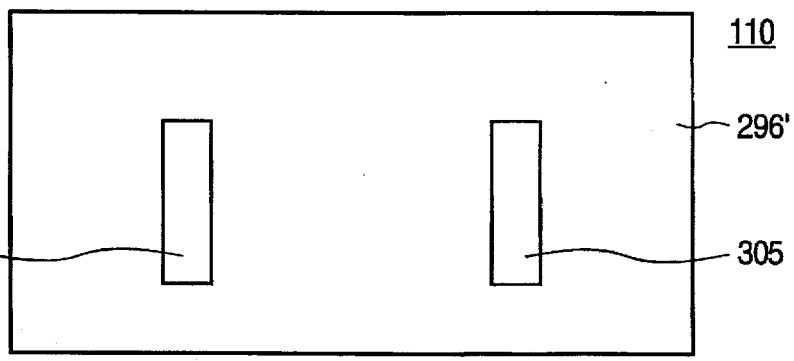
Figure 4I:
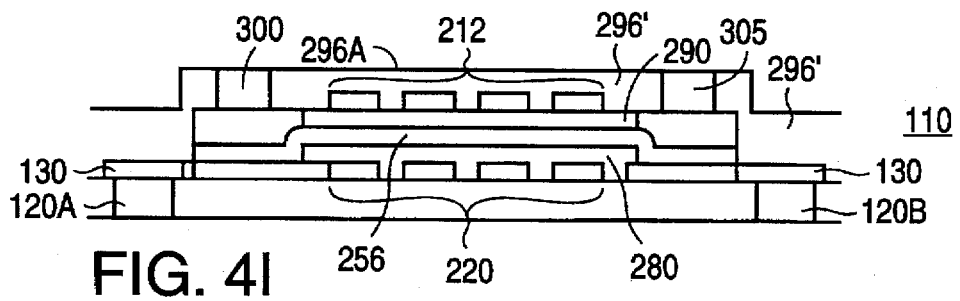

Insulative layer 296 is lapped and/or chemical mechanical polished or planarized (CMP) down to a level which exposes side pole extensions 300 and 305 as shown in FIGS. 3I and 4I. This lapping causes layer 296 to become planarized. The planarized lapped layer thus formed is subsequently referred to as cocoon layer 296'. In one embodiment, insulative layer 296 exhibits the following characteristics. Layer 296 is electrically insulative and optically transparent. Layer 296 is sufficiently mechanically robust to withstand the lapping, machining or polishing needed to planarize layer 296. Layer 296 also exhibits minimal film stress which is typically less than approximately 100 Mega Pascals. In one embodiment, insulative layer 296 is optically transparent to permit visualization of alignment targets on substrate surface from above head structure 110. An example of one material that is found to produce acceptable results as insulative layer 296 is sputtered aluminum oxide. Sputtered or low temperature chemically vapor deposited silicon oxides can also be used as insulative layer 296.

As a result of the processing conducted thus far, the partially complete head assembly 110 of FIGS. 3I and 4I is enclosed in a protective cocoon which electrically insulates and environmentally protects second coil layer 212, via connective members 120A and 120B, and via caps 130. The substantially planar upper surface of cocoon layer 296' is referred to as planar surface 296A. Providing a cocoon structure with a planarized surface 296A in this manner enhances the planarity of thin film structures which will subsequently be fabricated on top of the cocoon structure.

Figure 4J:
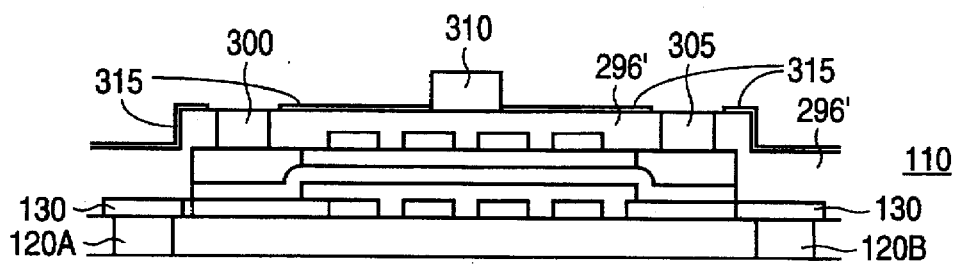

The upper surface of partially complete head 110 of FIG. 4J is then covered with a layer of Cr-Cu which is patterned and etched to form seed layer. More specifically, the portion of the Cr-Cu layer below insulative pedestal 310 is etched away and the portions of the Cr-Cu layer atop side pole extensions 300 and 305 are etched to form patterned seed layer 315 as shown in FIG. 4J. The portions of the Cr-Cu layer atop the pole extensions are removed to prevent degradation in the magnetic path by non magnetic films. For simplicity, seed layer 315 is not shown in subsequent cross-sectional drawings.

Figure 3J:
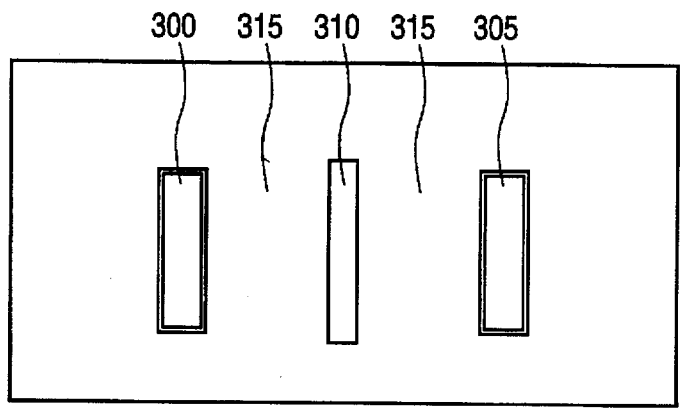

To aid in subsequently forming an elevated gap structure, an insulative pedestal 310 is patterned atop the central portion of cocoon layer 296' as shown in FIG. 3J and FIG. 4J. Insulative pedestal 310 is readily fabricated from the same electron-beam cured AZ4620 photoresist used to form first insulating layer 280.

Figure 3K:
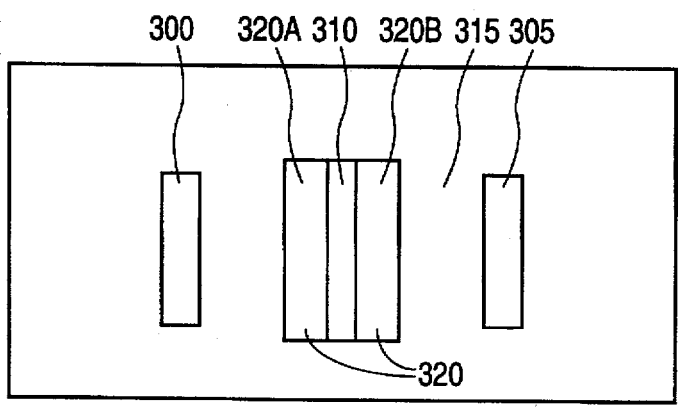
Figure 4K:
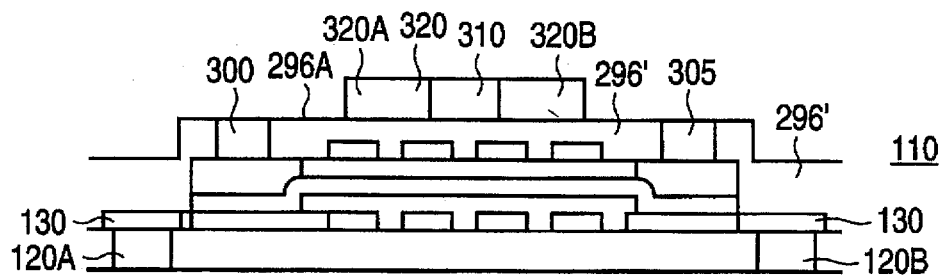

A first elevated yoke 320 is then patterned and plated atop planar surface 296A on both lateral sides of insulative pedestal 310 as shown in FIGS. 3K and 4K. More particularly, first elevated yoke 320 includes yoke portion 320A on one lateral side of insulative pedestal 310 and another yoke portion 320B on the other later side of insulative pedestal 310. First elevated yoke 320 is fabricated from magnetic material such as NiFe, for example. In this particular embodiment, yoke portions 320A and 320B each exhibit a substantially rectangular geometry.

Figure 3L:
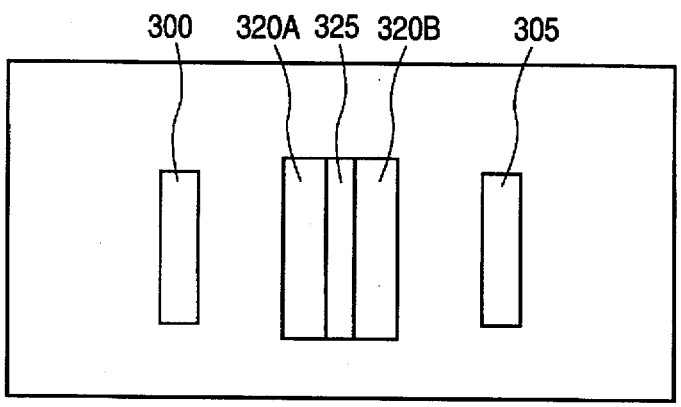
Figure 4L:
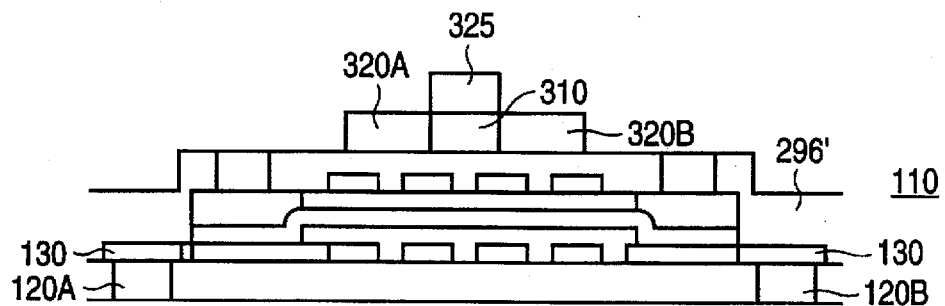

An elevated insulative member 325 is then patterned atop insulative pedestal 310 as shown in FIGS. 3L and 4L. In this particular embodiment, elevated insulative member 325 exhibits substantially the same geometry as insulative pedestal 310. Elevated insulative member 325 thus substantially covers insulative pedestal 310. Elevated insulative member 325 is readily fabricated from the same electron-beam cured AZ4620 photoresist used to form first insulating layer 280.

Figure 3M:
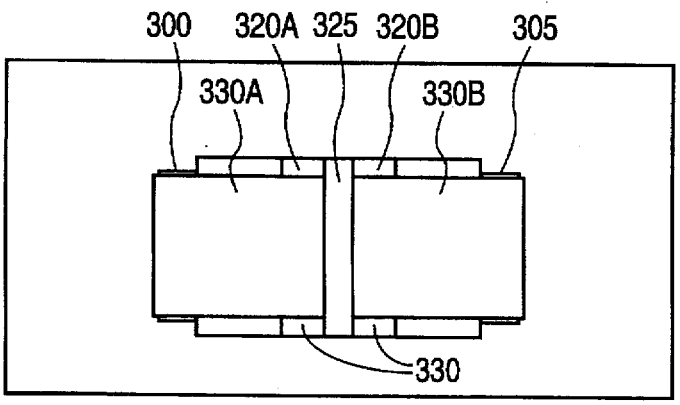
Figure 4M:
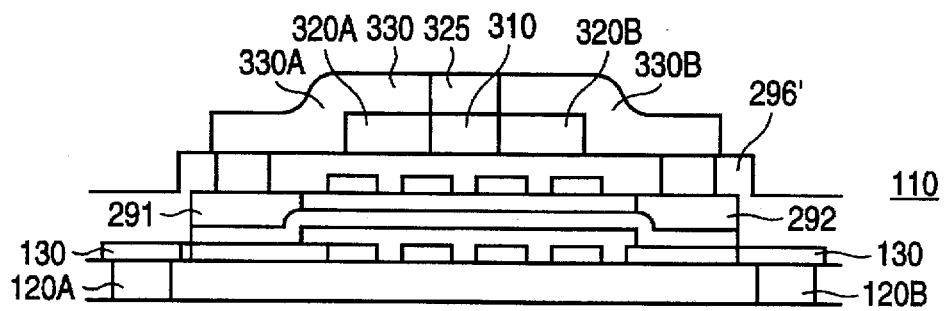

A second elevated yoke 330 of magnetic material such as NiFe is patterned and plated atop side pole extension 300 and 305 and yoke portions 320A and 320B as shown in FIGS. 3M and 4M. Second elevated yoke 330 includes yoke portions 330A and 330B which are situated adjacent opposite lateral sides of elevated insulative member 325.

Figure 4N:
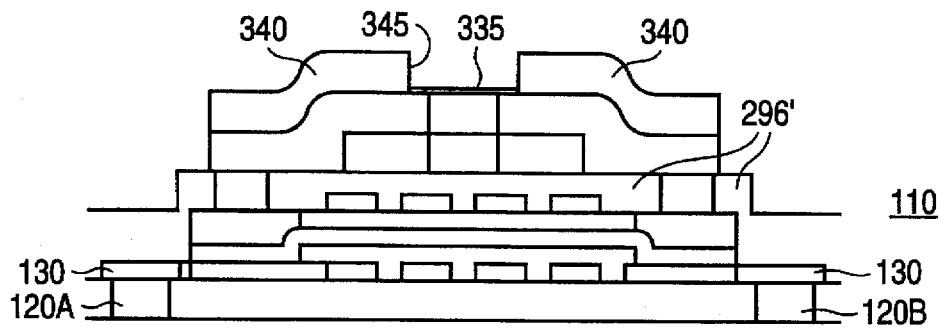

A "lift-off" process is now employed to form a Cr-NiV seed layer 335 atop elevated insulative member 325 and an adjacent part of yoke portions 330A and 330B. The reason for forming seed layer 335 in this location is to permit subsequent plating of pole structures thereon. To actually form seed layer 335 by the lift-off process, the upper surface of partially complete head structure 110 of FIG. 4M is covered with photoresist (not shown). The photoresist is patterned to cover the entire upper surface of structure 110 except for the portion thereof where seed layer 335 is to be formed. (FIG. 4N shows the desired location of seed layer 335.) A layer of Cr-NiV (not shown) is then sputtered on the exposed upper surface of partially complete head structure 110.

Figure 3N:
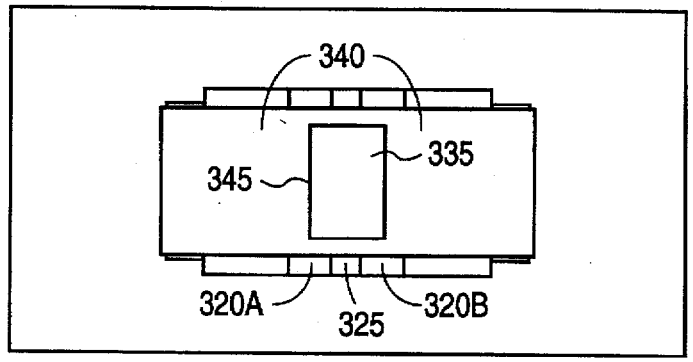

The photo-resist which was patterned on head structure 110 is now "lifted-off" head structure 110. To accomplish this lift-off, the partially complete head 110 is placed in an ultrasonic bath including a photoresist solvent such as acetone, for example. The sputtered Cr-NiV layer is sufficiently thin such that it does not cover the photoresist layer very well at the lateral sides of 330A and 330B. In this manner, there are sufficient avenues of attack by which the solvent can get through the sputtered Cr-NiV layer at the edges thereof to dissolve the photoresist layer. When the photoresist layer is thus dissolved, the portions of the sputtered Cr-NiV layer float away except for the remaining desired seed layer location 335 as shown in FIGS. 3N and 4N where no photoresist was present. Seed layer 335 is not shown in subsequent cross sectional drawings.

As shown in FIGS. 3N and 4N, a frame 340 of hard protective wear material such as diamond-like carbon (DLC) is now formed atop yoke portions 330A and 330B except for the portion thereof on which seed layer 335 is situated. A pole chamber or well 345 is thus formed in DLC frame 340. To fabricate such a DLC protective frame 340, a silicon layer (not shown in FIG. 4N) is sputtered on the upper surface of the partially complete head 110 of FIG. 4N prior to formation of DLC frame 340. This silicon layer acts as an adhesion layer for the subsequent deposition of a DLC layer.

A hard protective wear material layer such as diamond-like carbon (DLC) is then deposited on the entire upper surface of the partially complete head structure 110. In one embodiment, the DLC layer is deposited by chemical vapor deposition (CVD). The silicon adhesion layer enhances the adhesion of the DLC layer to the layers of head structure 110 below. This silicon adhesion layer typically exhibits a thickness within the range of approximately 400 Å to approximately 1000 Å. This silicon adhesion layer exhibits a nominal thickness of approximately 600 Å in a preferred embodiment.

The DLC layer is then patterned and reactive ion etched to form a DLC frame 340 with a geometry including a substantially rectangular pole chamber 345 above seed layer 335 as shown in FIGS. 3N and 4N. Pole structures will be subsequently formed within pole chamber as discussed later. DLC frame 340 is substantially rectangular. The portion of the silicon adhesion layer above seed layer 335 is etched away with a reactive ion etch using an approx. 80% to approx. 90% $CF_4$—approx 20% to approx 10% $O_2$ gas mixture after the reactive ion etch of the DLC layer which forms DLC frame 340.

Protective layer 340 exhibits a Knoop hardness greater than approximately 700 Knoop and preferably greater than approximately 800 Knoop. The hardness of this protective layer should be within the range of greater than approximately 700 Knoop to approximately 1800 Knoop. It is also possible to use a protective layer with a Knoop hardness greater than 1800 Knoop as protective layer 340. One material that is satisfactory for formation of protective wear layer 400 is diamond like carbon (DLC).

More detail is now provided with respect to the formation of DLC protective wear layer 340. Before DLC protective wear layer 340 is actually laid down on the silicon adhesion layer, the adhesion layer is sputter cleaned. In the course of performing this sputter cleaning, approximately 200 Å of the upper surface of the silicon adhesion layer is removed. More particularly, the silicon adhesion layer is sputter cleaned in a SAMCO plasma machine, Model No. PD-200D (Plasma Enhanced CVD System For DLC Deposition and Etching), hereafter the "plasma machine". This sputter cleaning is performed with Argon in a plasma within the plasma machine vessel at a pressure of 70 mTorr with 180 watts RF input power at a frequency of 13.56 MHz. The flow rate of Argon is approximately 100 sccm. The partially complete head structure 110 is situated on a 6 inch diameter cathode (ie. the energized electrode) of the SAMCO plasma machine, Model PD-200D, for approximately 3 to approximately 4 minutes.

Immediately after the Argon plasma cleaning (sputter etching) is complete, the input power is changed to 110–350 Watts to the same 6 inch cathode electrode. The Argon source is turned off and a source of liquid hydrocarbon DLC source material is turned on. For example, one DLC source material that may be used is Part No. S-12 available from SAMCO, Sunnyvale, Calif. The pressure within the vessel is approximately 10-approximately 25 mTorr at a flow rate of source material of approximately 6 to approximately 25 $cm^3$/min. Although the temperature is not specifically controlled during this process, the wafer on which the head is fabricated is situated on a water-cooled cathode while in the plasma machine. Under these conditions, a DLC deposition rate of approximately 1000 Å/min is obtained which is maintained until the desired DLC thickness is reached, namely approximately 5μ to approximately 10μ.

DLC fabricated in this manner results in a DLC layer 340 with a Knoop hardness of approximately 800 to approximately 1800. It is found that DLC layer Knoop hardnesses of greater than approximately 700 up to approximately 1800 Knoop produce an acceptably hard wear layer 400 for wear protection purposes. In one embodiment, the hardness profile of the DLC layer is varied. For example in such a varied hardness profile embodiment, the DLC layer is formed by a DLC deposition of 1–2μ of 800 Knoop DLC, followed by 3–4μ of 1300–1800 Knoop DLC followed by 3–4μ of 800 Knoop DLC. These thickness and hardness numbers are approximate. A DLC layer 340 with a vertically varied sandwich-like hardness profile is thus formed. The DLC layer is then reactive ion etched as described to form DLC wear layer 340 depicted in FIG. 4N. This reactive ion etching step is used to form pole chamber or well 345 as a substantially rectangular chamber within DLC frame 340.

Figure 3O:
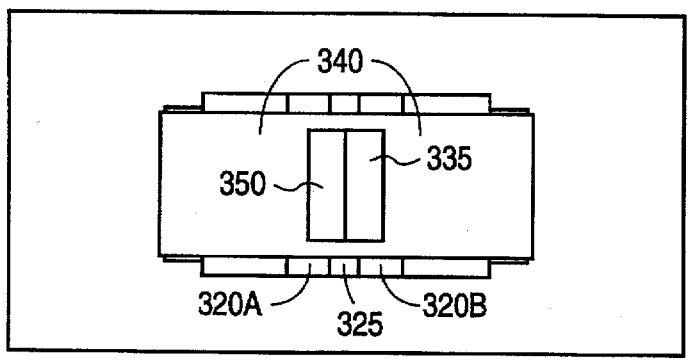
Figure 3P:
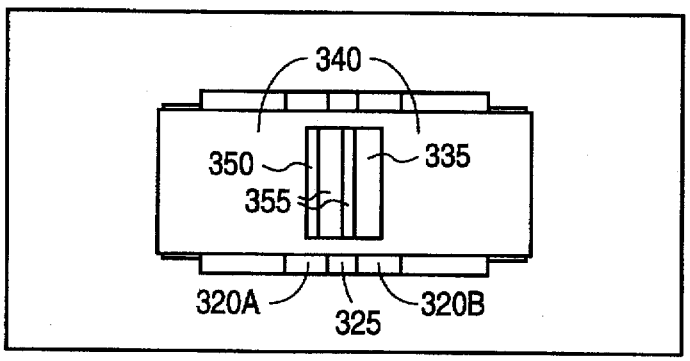
Figure 3Q:
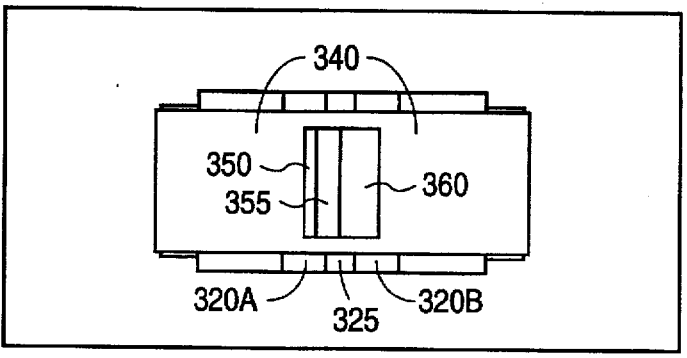
Figure 4O:
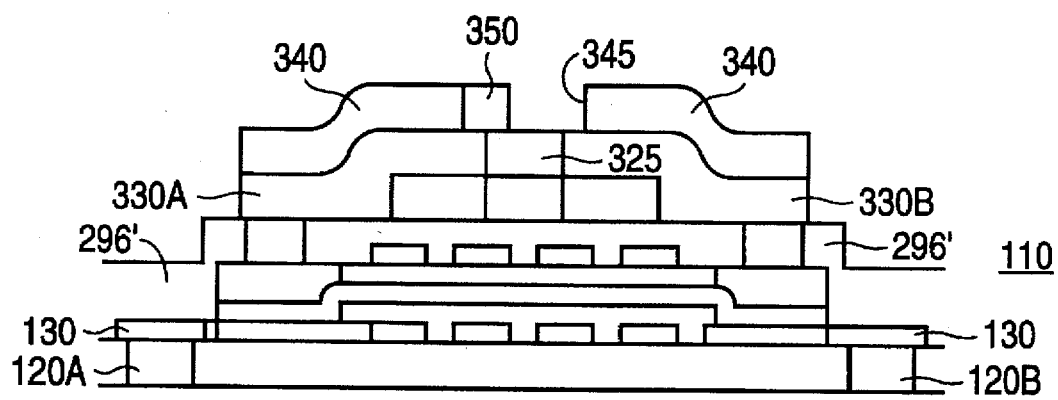
Figure 4P:
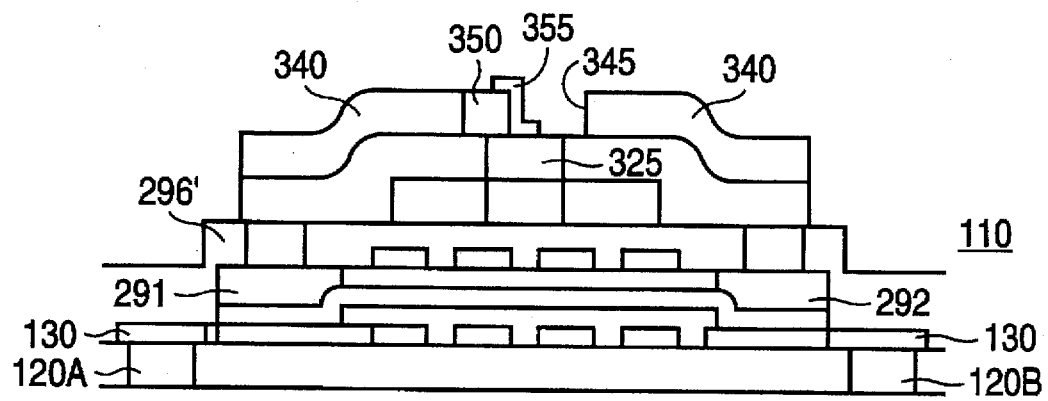
Figure 4Q:
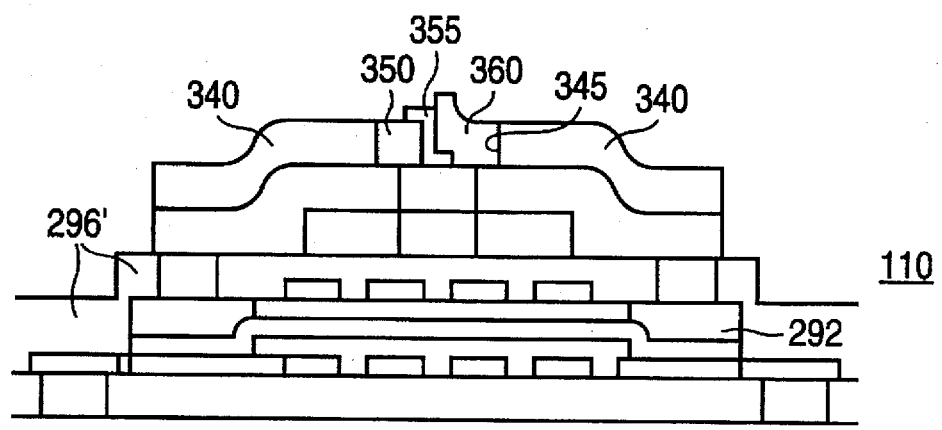

A first top pole 350 of magnetic material such as NiFe is then patterned and plated within pole chamber 345 so as to extend above yoke portion 330A from the edge of pole chamber 345 part way into pole chamber 345 as shown in FIGS. 3O and 4O. In this manner first top pole 350 makes electrical and magnetic contact with yoke portion 330A. A gap region 355 of hard durable protective material such as diamond-like carbon (DLC) is formed adjacent first top pole 350 as shown in FIGS. 3P and 4P. Gap region 355 exhibits a substantially rectangular geometry as shown in FIG. 3P. A second top pole 360 is then patterned and plated so as to fill in the remainder of pole chamber 345 between gap region 355 the edge of pole chamber 345 as shown in FIGS. 3Q and 4Q. Second top pole 360 exhibits a substantially rectangular geometry.

The upper surface of partially complete head structure 110 of FIG. 4Q is lapped or machined to form the desired contour for the head media interface as shown in the cross section of FIG. 5. In this particular embodiment, the upper surface of head structure 110 is lapped to provide the head assembly with a rounded contour surface 110A. Also in this particular embodiment, the gap length, $L_G$, of head 100 is approximately 0.4 microns. An upper head assembly 365 is thus formed by the layers of thin film head structure 110 above protective cocoon 296' as shown in FIG. 5. Upper head structure 365 includes insulative pedestal 310, seed layer 315 (CrCu) (not shown), first elevated yoke 320 (yoke portions 320A and 320B), elevated insulative member 325, second elevated yoke 330 (yoke portions 330A and 330B), seed layer 335, DLC frame 340, pole chamber 345, first top pole 350, gap region 355 and second top pole 360. The planarity of the individual layers which form upper head structure 365 is substantially enhanced by planar cocoon layer 296'.

In actual practice, thousands of heads 110 are fabricated on a common die or substrate. At the completion of the fabrication process, the substrate is diced up into individual heads such as that shown in FIG. 5. In this particular embodiment, the dimensions of the substrate of head 110 after dicing are approximately 0.7 mm by approximately 1 mm. The miniaturized rectangular dimensions of head 110 readily fit within a miniaturized window 430 on the rotary head assembly 400 of FIG. 6A. or within the slot 455 of rotary head assembly 450 of FIG. 6B. Tape cupping as the media tape passes the window or slot is thus significantly reduced.

Figure 6A:
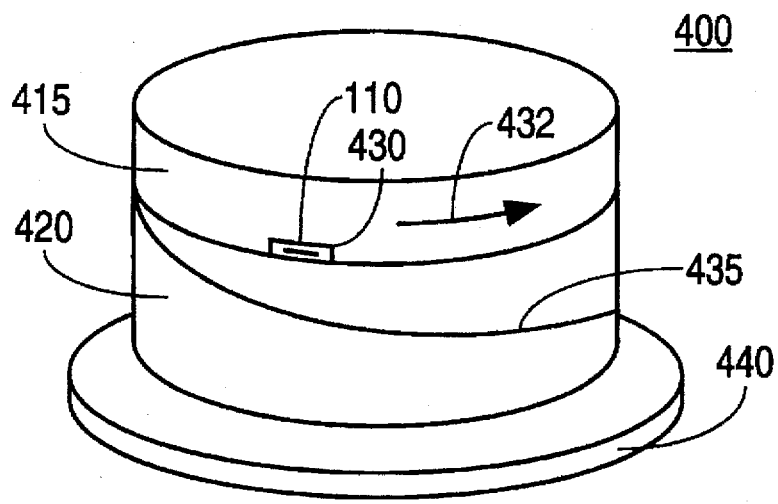
FIG. 6A is a top perspective view of a head assembly employing the thin film head of FIG. 5 mounted within a window in a rotary drum.

FIG. 6A shows a rotary head assembly 400 in which head 110 can be employed. Rotary head assembly 400 includes a cylindrical rotating drum 415 and a cylindrical fixed drum 420. Rotary drum 415 rotates in the direction indicated by arrow 432. Tape media passes along recess 435 which acts as a tape guide. Recess 435 is situated at an angle of approximately 5 to approximately 30 degrees with respect to the end of cylindrical rotary drum 415 which faces fixed drum 420. Rotary drum 415 includes a substantially rectangular window 430 in which head 110 is fixedly mounted so as to rotate with the rotary drum. In this particular embodiment, the dimensions of window 430 are approximately 1 mm or less by approximately 3 mm or less. A motor 440 is attached to rotary drum 415 internal to assembly 400 to rotably drive drum 415 at 1500 RPM as the tape media passes along tape guide or recess 435. Suitable electrical connection (not shown) is made to head 110 to permit reading from and writing to the magnetic tape media.

Figure 6B:
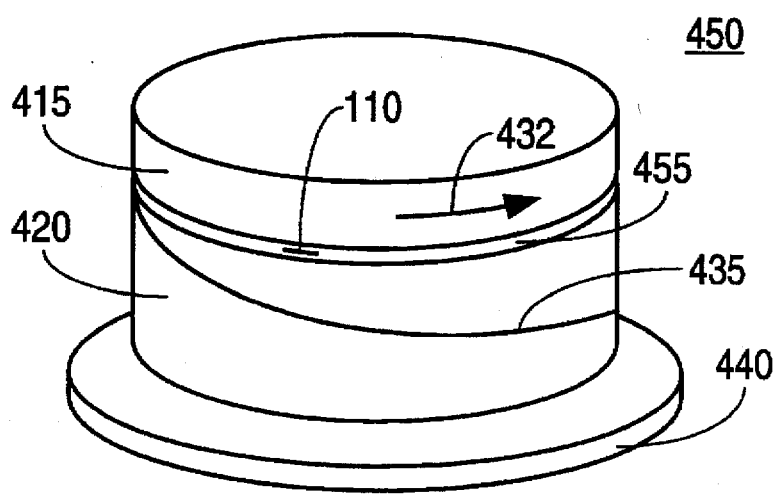
FIG. 6B is a top perspective view of a head assembly employing the thin film head of FIG. 5 mounted in a circumferential slot between a rotary drum and a fixed drum.

FIG. 6B shows another rotary drum assembly 450 in which head 110 is employed. Rotary drum assembly 450 is substantially similar to rotary drum assembly 400 except that head 110 is mounted within a circumferential slot 455 between rotary drum 415 and fixed drum 420 rather than head 110 being situated in window 430. The vertical dimension of slot 455 is approximately 1 mm or less, in this particular embodiment.

While a helical type magnetic coil structure is shown in the thin film head depicted in FIGS. 3A–3Q and FIGS. 4A–4Q and FIG. 5, alternative embodiments are also possible employing other types of coil structures. For example, when miniaturization is of a lesser concern, a spiral pancake type of coil can be employed in the lower portion of the thin film head instead of a helical coil. In such an embodiment, the spiral pancake coil structure is covered with a protective cocoon structure substantially as already described with reference to the cocoon structure which covers the helical coil structure of thin film head assembly 110. Although this spiral pancake coil embodiment is not as easily miniaturized as the helical coil embodiment, it nevertheless still has the advantages of a protective cocoon structure which also acts as an intermediate planarizing structure for the upper layers of the thin film head assembly.

Figure 7:
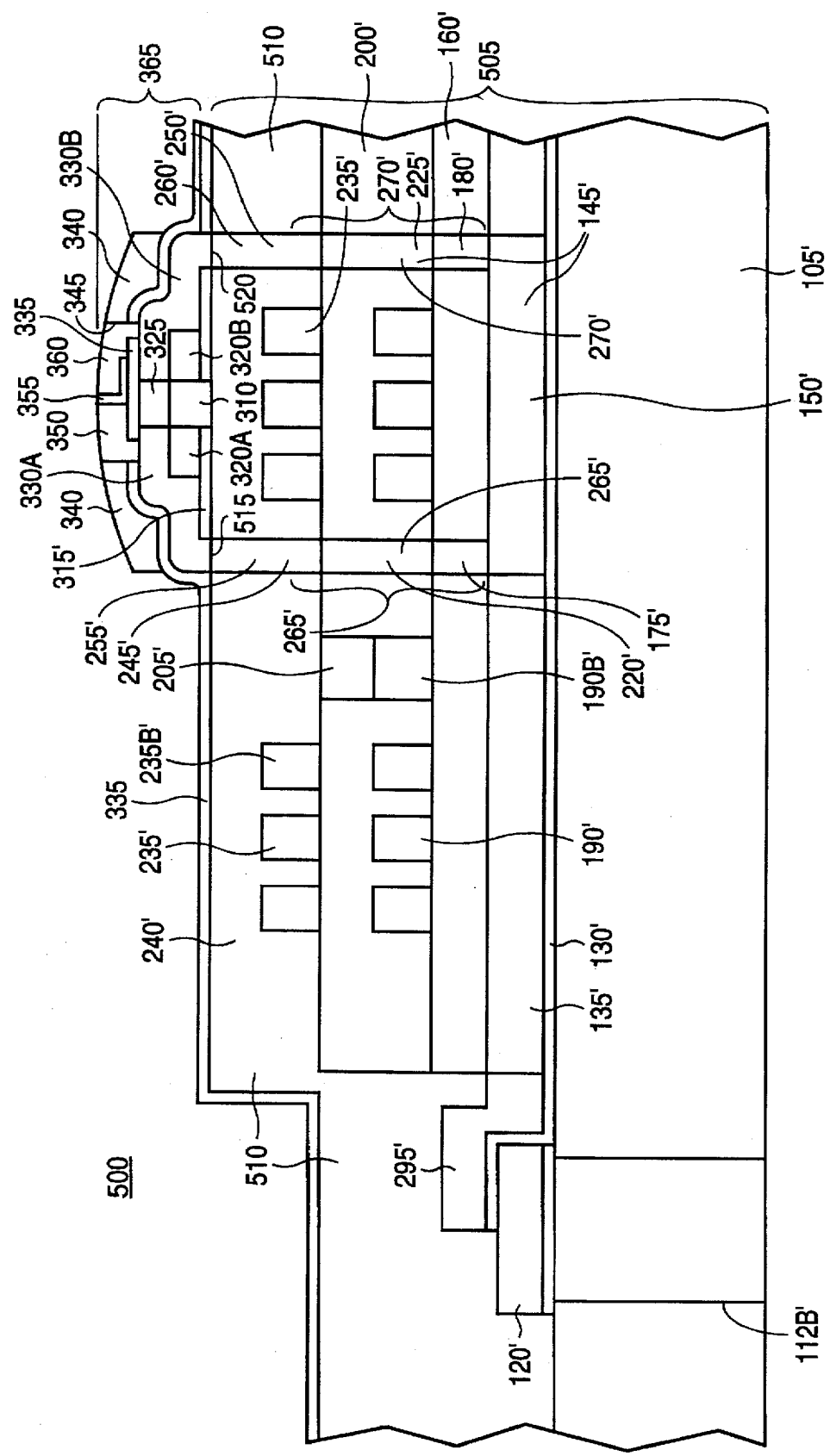
FIG. 7 is an alternative thin film head assembly employing a pancake spiral coil structure.

An example of such a thin film head assembly including a spiral pancake coil with a protective planarizing cocoon structure is seen in FIG. 7 as thin film head assembly 500. Thin film head assembly 500 includes a main core and coil section 505 which has several elements in common with the main core and coil section disclosed in our patent application entitled "Thin Film Magnetic Head Including Layered Magnetic Side Poles", Malhotra et al., Ser. No. 08/297,186 filed Aug. 26, 1994, the disclosure of which is incorporated herein by reference. For ease of reference in the following brief description of main core and coil section 505, the same reference numerals employed in Malhotra et al. are used herein except that the prime notation is employed after each numeral. The differences between the cited Malhotra et al. patent application and the present thin film head assembly 500 are discussed below.

Thin film head 500 includes an alumina substrate 105' in which via holes are formed for receiving via connective members 112A', 112B' and 112C' of which a representative via connective member 112B' is illustrated. The via connective members are covered by via caps such as via cap 120' which protect the via connective members from etchants used in subsequent etching steps. Via connective member 112B' couples the magnetic core of the head to ground in this particular embodiment. The remaining via connective members (not shown) couple to the respective ends of lower coil layer 190' and upper coil layer 235'. This arrangement facilitates connection of the head 500 to external electrical circuitry.

A magnetic yoke 145' is built up, layer by layer, on a seed layer 130' of conductive material disposed on the upper surface of substrate 105'. One magnetic material which may be used as material for magnetic yoke 145' is nickel-iron (NiFe). Bottom magnetic layer 150' is plated in an opening in an insulative layer 135' which is situated atop seed layer 130'. First magnetic side pole 265' is built up, layer by layer, at one end of bottom magnetic layer 150' while second magnetic side pole 270' is built up, layer by layer, at the other end of bottom magnetic layer 150' as shown in FIG. 7. More specifically, each of the magnetic layers or members 175', 220' and 255' which together form first side pole 265' are built up in open regions in respective insulative layers 160', 200' and cocoon layer 510. Likewise, each of the magnetic layers or members 180', 225' and 260' which together form second pole 270' are built up in open regions in respective insulative layers 160', 200' and cocoon layer 510. Thus, magnetic yoke 145' is formed by bottom magnetic layer 150', magnetic layers 175', 220', 255 and magnetic layers 180', 225', 260', all of which are plated using common seed layer 130 as an electrode. Cocoon layer 510 is a layer of electrically insulative material bearing substantially the same characteristics as insulative layer 296 which was discussed earlier. Aluminum oxide is an example of one material which can be employed as cocoon layer 510.

One embodiment of head 100 includes a grounding strip 295' which couples via connective member 112B' to magnetic yoke 145' by the electrically conductive path through seed layer 130'. Grounding strip 295' and connective member 112B' are omitted if grounding of head 500 is not desired for a particular application.

Cocoon layer 510 covers the components of thin film head assembly 500 therebelow, but includes openings 515 and 520 at which the upper ends of first side pole 265' and second side pole 270' are respectively positioned. An upper head assembly 365, which is substantially similar to upper head assembly 365 of FIG. 5, is situated atop main core and coil section 505 as shown in FIG. 7. It will be recalled that this upper head assembly 365 includes insulative pedestal 310, seed layer 315 (CrCu), first elevated yoke 320 (yoke portions 320A and 320B), elevated insulative member 325, second elevated yoke 330 (yoke portions 330A and 330B), seed layer 335, DLC frame 340, pole chamber 345, first top pole 350, gap region 355 and second top pole 360. The planarity of the individual layers which form upper head structure 365 is substantially enhanced by planar cocoon layer 510.

FIG. 7 specifically shows the seed layer 315' below yoke portions 320A, 320B, 330A and 330B. In this particular embodiment, seed layer 315' is etched away outside of upper head assembly 365 as shown. In actual practice, to complete the head structure, the silicon adhesion layer (not shown) below the DLC layer which forms DLC frame 340 is reactive ion etched away from areas of the head outside of DLC frame 340.

The foregoing has described a head structure which exhibits a geometry and configuration that is suitable for miniaturization to fit within reduced size slots and windows in a rotary head assembly. The helical coil embodiment of the head structure advantageously exhibits a coil resistance which is significantly less per coil turn than head assemblies using planar spiral coil structures. The protective cocoon structure advantageously protects the coil structure and core from undesired environmental effects while simultaneously promoting the planarity of structures fabricated atop the cocoon.

While only certain preferred features of the invention have been shown by way of illustration, many modifications and changes will occur. It is, therefore, to be understood that the present claims are intended to cover all such modifications and changes which fall within the true spirit of the invention.

We claim:

1. A thin film head comprising:
   a substrate of electrically insulative material;
   a thin film coil structure situated atop the substrate;
   a core of thin film magnetic material extending through the thin film coil structure to enable the thin film coil structure to magnetically excite the core, the core including first and second side pole members having respective first and second side pole ends;
   a protective cocoon of electrically insulative material covering the thin film coil structure and the core except for the first and second side pole ends, the protective cocoon including an upper planar surface which exposes the first and second side pole ends; and
   an elevated, thin film magnetic gap structure situated atop the coil structure and the upper planar surface of the protective cocoon, the gap structure including a first top pole member and a second top pole member which are respectively magnetically coupled to the first and second side pole ends, a gap region being formed between the first top pole member and the second top pole member.

2. The thin film head of claim 1 wherein the protective cocoon is comprised of aluminum oxide.

3. The thin film head of claim 1 wherein the thin film coil structure comprises a helical coil.

4. The thin film head of claim 1 wherein the thin film coil structure comprises a spiral pancake coil.

5. The thin film head of claim 1 wherein the upper planar surface of the protective cocoon is a planarized surface.

6. The thin film head of claim 1 wherein the protective cocoon is comprised of a silicon oxide.

7. A magnetic storage device comprising:
   a means for providing a magnetic storage medium;
   a thin film head for use with the magnetic storage medium, the thin film head further comprising:
   a substrate of electrically insulative material;
   a thin film coil structure situated atop the substrate;
   a core of thin film magnetic material extending through the thin film coil structure to enable the thin film coil structure to magnetically excite the core, the core including first and second side pole members having respective first and second side pole ends;
   a protective cocoon of electrically insulative material covering the thin film coil structure and the core except for the first and second side pole ends, the protective cocoon including an upper planar surface which exposes the first and second side pole ends; and
   an elevated, thin film magnetic gap structure situated atop the coil structure and the upper planar surface of the protective cocoon, the gap structure including a first top pole member and a second top pole member which are respectively magnetically coupled to the first and second side pole ends, a gap region being formed between the first top pole member and the second top pole member; and
   an actuator means coupled to the thin film head for moving the head relative to the storage medium.

8. The magnetic storage device of claim 7 wherein the protective cocoon is comprised of aluminum oxide.

9. The magnetic storage device of claim 7 wherein the thin film coil structure comprises a helical coil.

10. The magnetic storage device of claim 7 wherein the thin film coil structure comprises a spiral pancake coil.

11. The magnetic storage device of claim 7 wherein the upper planar surface of the protective cocoon is a planarized surface.

12. The magnetic storage device of claim 7 wherein the protective cocoon is comprised of a silicon oxide.

* * * * *